Patented Dec. 19, 1933

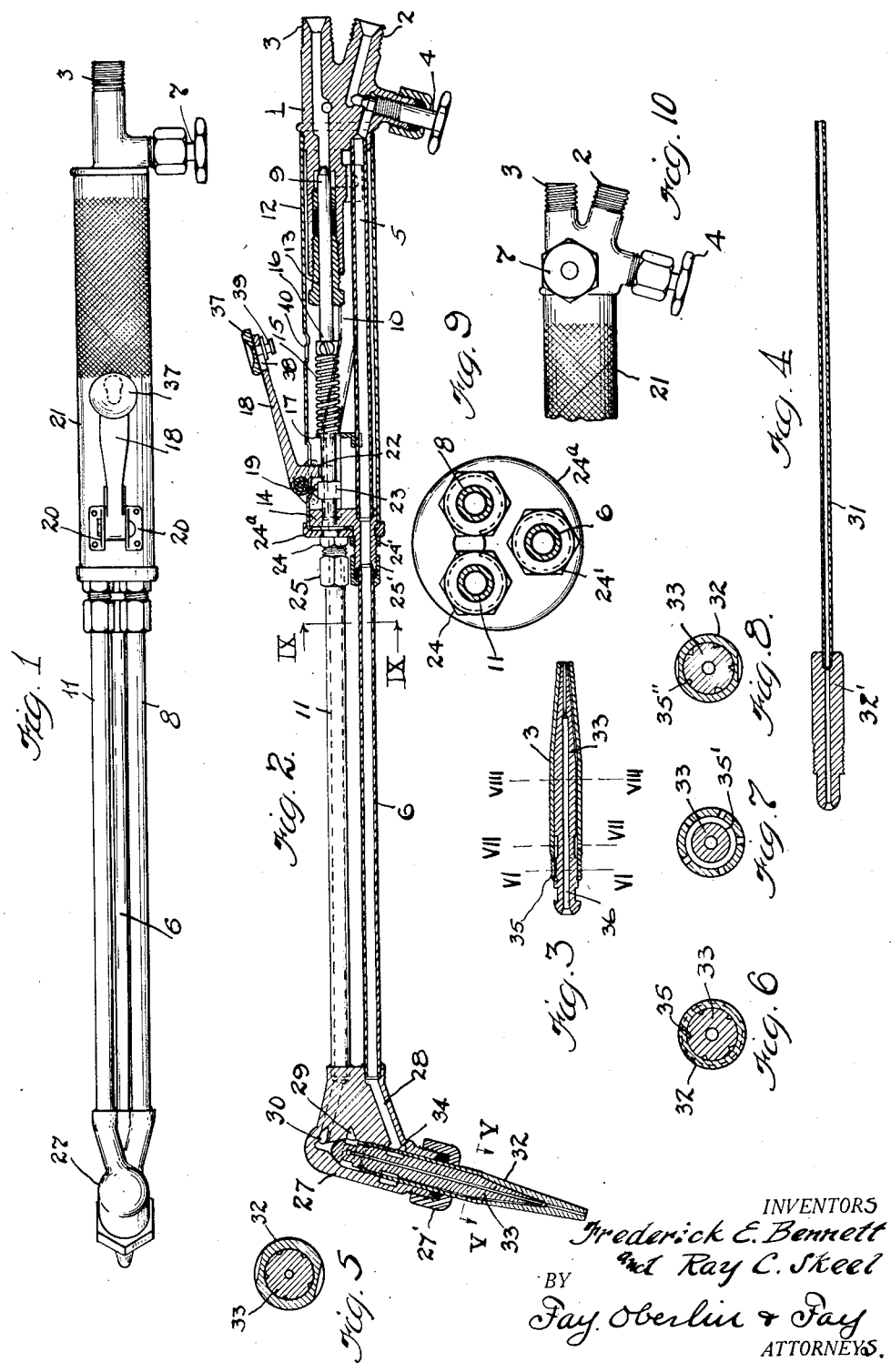

1,940,343

UNITED STATES PATENT OFFICE 1,940,343

INTERCHANGEABLE TORCH

Frederick E. Bennett, Shaker Heights, and Ray C. Skeel, Lakewood, Ohio, assignors to The National Welders Manufacturing and Supply Company, Cleveland, Ohio, a corporation of Ohio Application October 29, 1928. Serial No. 315,613

5 Claims. (Cl. 158—27.4)

This invention relates to gas torches, and more particularly a device of this character for general purpose usage; and it is among the objects of the invention to provide a construction readily adaptable to various types of work, and without requirement of an excessive number of parts. Another object is the provision of a construction affording safety and durability, even in the hands of operators lacking in the highest degree of skill. Other objects and advantages will appear as the description proceeds.

To the accomplishment of the foregoing and related ends, the invention, then, consists of the features hereinafter fully described, and particularly pointed out in the claims, the following description and the annexed drawing setting forth in detail certain structure embodying the invention, such being illustrative, however of but one of the various ways in which the principle of the invention may be employed.

In said annexed drawing:

Fig. 1 is a plan view of an embodiment of the invention; Fig. 2 is a longitudinal section; Figs. 3 and 4 are longitudinal sections of details; Fig. 5 is a transverse section taken on a plane indicated by the line V—V, Fig. 2; Figs. 6, 7, 8 and 9 are transverse sections taken on planes indicated respectively by the lines VI—VI, VII—VII, VIII—VIII, Fig. 3, and IX—IX, Fig. 2; and Fig. 10 is a fragmentary detail in elevation.

Referring more particularly to the drawing, there is shown a valve body 1 having inlets 2, 3, for fuel gas and oxygen respectively. Valve 4 transversely of the passageway guards the gas inlet and a port directly from the valve leads to duct 5, which connects with tube 6 in turn. A valve 7 is arranged transversely of the oxygen passageway and a port therefrom leads down and laterally through the valve body to a duct which connects with tube 8 in turn. In general line with the oxygen inlet passageway is a valve 9, from which a port leads down to the duct 10, which connects with tube 11 in turn. The valve 9 preferably is of a construction presenting an elongated stem which rides axially in a stuffing box gland collar 12, stuffing box screw bushing 13 (suitable packing being interposed therebetween), and in assembly block 14. A spring 15 about the valve stem tends to normally urge it into seating position, an adjustable collar 16 held by a set screw serving as one abutment, and a reaction abutment member 17 fixed to the duct assembly, serving as the other abutment. For actuation of the valve, preferably a lever control is employed, and this may take the form of an operating lever 18 pivoted at 19 in brackets 20 positioned on the casing 21; and projecting from the lever 18, bell crank-lugs 22 may be arranged to straddle the valve stem, and thrust against an adjustable abutment 23 for instance in the form of a collar fixed to the valve stem by a screw. An outer bearing support for the valve stem may then be readily had in the assembly head 14.

The respective ducts 5, etc., from the gas and oxygen inlets may be advantageously constructed as tubing sections, positioned at the inner end in the valve body, and at the outer end in the assembly block 14. The casing 21 may then allow complete enclosure and protection, the assemblage being further secured by nuts 24, 24' against a flange-washer 24a. Connecting by unions 25, 25', from the respective ducts in turn are the tubes 6, 8 and 11, these then connecting into a tip head 27, which is ordinarily set at an angle with respect to the connecting tubes and valve assembly. The tip head is provided with passageways for the gas and the oxygen, a passageway 28 leading to a lateral inlet into the tip, and a passageway 29 leading to a lateral inlet to the core of the tip, while a passageway 30 leads to the end of the tip.

In its general arrangement, the tip proper comprises an elongated member screw-threadedly engageable into the tip head and having a longitudinal central bore. Where the torch is to be played into recesses of some depth, as for instance in the practice of carbon burning, an extension 31 is desirably provided in the tip. By assembling the tip with a shell 32 and a core 33, passageways 35″ may be conveniently had between shell and core, and an inlet thereto for alignment with the gas passageway 28 may be had at 34. Desirably, a comprehensive set of passageway arrangements will include also passageways 35 entering between the shell and the core, and thus communicable with lateral passageway 29.

To those skilled in the art, the manner of usage of the device will be readily understood. With connections from suitable high pressure sources to the gas and oxygen inlets 2, 3, control of the gas feed may be had by the valve 4, and oxygen may then be controlled for admission by valve 7 through to tube 8 and tip head passageway 29, thence through the lateral opening into the core passageway 35. The flame thus produced with the gas feed from passageway 28 into the passageways between the tip shell and core is especially desirable for welding usages.

Where the nature of the work is more along the line of cutting, conveniently the oxygen feed may be handled through the valve 9 controlled by the thumb lever 18, the oxygen then proceeding through tube 11 and tip head passageway 30 and thence desirably through the core with enlarged axial passageway 36, while at the same time lateral supply feed is had through tip passageway 35. In order to relieve the operator from the necessity of continuously holding the valve lever 18 for open position, a locking means is desirably incorporated, and preferably this may comprise a button 37 slidably mounted on the lever 18 in a slot 38, and having a locking projection 39 which cooperates with a key hole shaped slot 40 in the casing 21. By pressing the lever 18 against the casing and shifting the button 37 forwardly, the locking projection 39 is forced into the narrowed end of the slot and there holds the lever against disengagement, until slid back to disengaging position.

It will thus be seen that the device affords within itself convenient usages of an all purpose torch, changes for welding or cutting etc. being quickly had, while at the same time the control features are effective in usage with a minimum of attention and fatigue on the part of the operator. Moreover the assemblage of tubes 6, 8, 11, with the handle-body portion of the device is rendered fool-proof and safe guarded against mis-matching of gas and oxygen lines, a mechanical guide being provided. For this, one of the connections, preferably the lower, is threaded left-handedly, the others being right handed. The tubes can thus be assembled in just one way, which is the correct relation, and a source of trouble heretofore existent in the art is averted. It will be noticed further that the tubes 6, 8, 11, are fundamentally arranged in a trussing relation with respect to each other and constitute a column of triangular section. As a result, the device even in long sizes is light but very rigid and resistant against distortion, and powerful leverage by a wrench on the tip will not occasion damage though the metal be hot.

Other modes of applying the principle of the invention may be employed, change being made as regards the details described, provided the means stated in any of the following claims, or the equivalent of such, be employed.

We therefore particularly point out and distinctly claim as our invention:—

1. A gas torch, comprising a valve body, a tip head having two top corners equidistant over the flame end of the tip and forming the base of a stress-triangle whose apex is the flame end of the tip, and means for parallelly bracing each top corner to the valve body.

2. A gas torch, comprising a valve body, a tip head having two top corners and a third corner therebelow toward the flame end, and means for parallelly bracing each such corner to the valve body, said bracing means including two tubular connections, a third tubular connection being positioned compactly stagger-wise with respect thereto from the third corner to the valve body.

3. A gas torch, comprising a valve body, a tip head and a tip therein, said tip head having two top corners equidistant over the flame-end of the tip and having three passage-ways, two of which enter the tip at its top end to axial and peripheral passage-ways respectively thereof, and the other of which enters the tip peripherally lower down, said two top corners forming the base of a stress-triangle whose apex is the flame-end of the tip, and combined bracing and conduit connections from said valve body to each said top corner of the tip head and communicating with the axial and peripheral passage-ways respectively at the top end of the tip, and a third such connection positioned stagger-wise with respect to the aforesaid conduit connections and communicating with the tip peripherally lower down.

4. A gas torch, comprising a valve body, a tip and a tip head, the latter having two top corners and a third corner therebelow toward the flame end, said tip head having three passage-ways, two of which enter the tip at its top end to axial and peripheral passage-ways respectively thereof and the other of which enters the tip peripherally lower down, tubular connections from said valve body to each said top corner of the tip head and communicating with the axial and peripheral passage-ways respectively at the top end of the tip, and a third tubular connection positioned stagger-wise with respect to the aforesaid tubular connections and communicating with the tip peripherally lower down.

5. A gas torch, comprising a valve body, a tip and a tip head, the latter having two top corners and a third corner therebelow toward the flame end, said tip head having three passage-ways, two of which enter the tip at its top end to axial and peripheral passage-ways respectively thereof and the other of which enters the tip peripherally lower down, tubular connections from said valve body to each said top corner of the tip head and communicating with the axial and peripheral passage-ways respectively at the top end of the tip, a third tubular connection positioned stagger-wise with respect to the aforesaid tubular connections and communicating with the tip peripherally lower down, and differential connecting means for the tubular connections to prevent mis-assembly to the valve body.

FREDERICK E. BENNETT.
RAY C. SKEEL.